US012798134B2

(12) United States Patent
Schizas et al.

(10) Patent No.: US 12,798,134 B2
(45) Date of Patent: Nov. 17, 2026

(54) BLADE SUPPORT, CUTTING MEMBER COMPRISING SUCH A BLADE SUPPORT, RAZOR HEAD COMPRISING SUCH A CUTTING MEMBER AND MECHANICAL SHAVING RAZOR COMPRISING SUCH A RAZOR HEAD

(71) Applicant: Bic Violex S.A., Anixi (GR)

(72) Inventors: Charalampos Schizas, Athens (GR); Vassilis Papachristos, Athens (GR); Vaggelis Spyropoulos, Ilion (GR); Christos Mavridis, Athens (GR); Dimitris Fotopoulos, Athens (GR); Yiannis Valtzis, Piraeus (GR); Efthimios Saltas, Athens (GR); Basant Jhoty, Athens (GR); Georgios Koulourias, Athens (GR)

(73) Assignee: BIC Violex S.A., Anixi (GR)

( * ) Notice: Subject to any disclaimer, the term of this patent is extended or adjusted under 35 U.S.C. 154(b) by 0 days.

(21) Appl. No.: 16/483,229

(22) PCT Filed: Jan. 24, 2018

(86) PCT No.: PCT/EP2018/051758
§ 371 (c)(1),
(2) Date: Aug. 2, 2019

(87) PCT Pub. No.: WO2018/141605
PCT Pub. Date: Aug. 9, 2018

(65) Prior Publication Data

US 2020/0230837 A1 Jul. 23, 2020

(30) Foreign Application Priority Data

Feb. 3, 2017 (EP) .................................... 17154637

(51) Int. Cl.
*B26B 21/56* (2006.01)
*B26B 21/22* (2006.01)
*B26B 21/40* (2006.01)

(52) U.S. Cl.
CPC ........... *B26B 21/565* (2013.01); *B26B 21/22* (2013.01); *B26B 21/4031* (2013.01)

(58) Field of Classification Search
CPC ... B26B 21/565; B26B 21/4031; B26B 21/22; B26B 21/4012; B26B 21/222; B26B 21/227; B26B 21/4068; B26B 21/521
See application file for complete search history.

(56) References Cited

U.S. PATENT DOCUMENTS 5,010,646 A 4/1991 Neamtu
5,661,907 A * 9/1997 Apprille, Jr. ........ B26B 21/4012 30/47

(Continued)

FOREIGN PATENT DOCUMENTS

EP 3178621 A1 * 6/2017 ............ B26B 21/14
JP 719755 B2 3/1995

(Continued)

OTHER PUBLICATIONS

Prospector, Plastic Design for Structural Use: Back to Basics, Feb. 16, 2018.*

(Continued)

*Primary Examiner* — Boyer D Ashley
*Assistant Examiner* — Fernando A Ayala
(74) *Attorney, Agent, or Firm* — Bookoff McAndrews, PLLC

(57) ABSTRACT

A blade support for a shaving razor including an inner face, an outer face an elongated lower portion, an elongated upper portion, and an elongated intermediate bent portion between the lower and upper portions. The upper portion extends (Continued)

forward of the intermediate bent portion to a top side. The lower portion extends downward from the intermediate bent portion to a bottom side. The top side and/or the bottom side are substantially curved surfaces.

20 Claims, 8 Drawing Sheets

(56) References Cited

U.S. PATENT DOCUMENTS

| | | | | |
|---|---|---|---|---|
| 6,161,288 | A * | 12/2000 | Andrews | B26B 29/00 30/527 |
| 7,131,202 | B2 * | 11/2006 | Pennell | B26B 21/4068 30/50 |
| 7,272,991 | B2 * | 9/2007 | Aviza | B26B 21/565 76/DIG. 8 |
| 7,448,135 | B2 * | 11/2008 | Zhuk | B26B 21/565 30/50 |
| 7,621,203 | B2 * | 11/2009 | Aviza | B26B 21/227 83/13 |
| 8,117,753 | B2 * | 2/2012 | Gilder | B26B 21/227 30/50 |
| 8,499,462 | B2 * | 8/2013 | Masek | B21D 53/645 30/346.54 |
| 8,567,068 | B2 * | 10/2013 | Luxton | B26B 21/4025 30/50 |
| 9,156,174 | B2 * | 10/2015 | Gratsias | B26B 21/565 |
| 11,117,278 | B2 * | 9/2021 | Walker, Jr. | B26B 21/225 |
| 2005/0198828 | A1 * | 9/2005 | Pennell | B26B 21/565 30/50 |
| 2007/0011880 | A1 * | 1/2007 | Pennell | B26B 21/4031 30/50 |
| 2007/0028450 | A1 | 2/2007 | Pennell et al. | |
| 2008/0066315 | A1 | 3/2008 | Xu | |
| 2010/0077618 | A1 * | 4/2010 | Peterson | B26B 21/22 30/50 |
| 2011/0232100 | A1 * | 9/2011 | Park | B26B 21/28 30/50 |
| 2012/0011725 | A1 * | 1/2012 | Gratsias | B26B 21/565 30/50 |
| 2014/0230252 | A1 * | 8/2014 | Davos | B26B 21/4068 30/50 |
| 2014/0360021 | A1 * | 12/2014 | Sonnenberg | B26B 21/52 427/236 |
| 2015/0013169 | A1 * | 1/2015 | Warrick | B26B 21/4031 30/50 |
| 2016/0167242 | A1 * | 6/2016 | Noh | B26B 21/565 30/50 |
| 2016/0207210 | A1 * | 7/2016 | Ren | B26B 21/34 |
| 2016/0361828 | A1 * | 12/2016 | Xu | C21D 9/0068 |
| 2017/0341247 | A1 * | 11/2017 | Zafiropoulos | B26B 21/565 |

FOREIGN PATENT DOCUMENTS

| | | | | |
|---|---|---|---|---|
| WO | WO86/02309 | * | 4/1986 | B26B 21/40 |
| WO | WO 0205984 | A2 | 1/2002 | |
| WO | WO 2005075161 | A1 | 8/2005 | |
| WO | WO 2005090024 | A2 | 9/2005 | |
| WO | WO 2005108024 | A1 | 11/2005 | |
| WO | WO 2006121729 | A2 | 11/2006 | |
| WO | WO 2007116356 | A2 | 10/2007 | |
| WO | WO 2007116358 | A2 | 10/2007 | |
| WO | WO 2007147420 | A1 | 12/2007 | |
| WO | WO 2010069388 | A1 | 6/2010 | |
| WO | WO 2010093133 | A2 | 8/2010 | |
| WO | WO 2010118771 | A1 | 10/2010 | |
| WO | WO 2012158141 | A1 | 11/2012 | |
| WO | WO 2015006079 | A1 | 1/2015 | |
| WO | WO 2015080113 | A1 | 6/2015 | |
| WO | WO 2006027018 | A1 | 3/2016 | |
| WO | WO 2016153798 | A1 | 9/2016 | |
| WO | WO 2016153799 | A1 | 9/2016 | |
| WO | WO 2018007131 | A1 | 1/2018 | |

OTHER PUBLICATIONS

Protolabs, Design Stronger Molded Parts with Ribs, Gussets, and Durable Materials, 1999.*
Engineers Edge, Plastic Injection Molding Design Considerations, 2000.*
International Search Report and Written Opinion mailed May 2, 2018, in International Application No. PCT/EP2018/051758 (8 pages).

* cited by examiner

BLADE SUPPORT, CUTTING MEMBER COMPRISING SUCH A BLADE SUPPORT, RAZOR HEAD COMPRISING SUCH A CUTTING MEMBER AND MECHANICAL SHAVING RAZOR COMPRISING SUCH A RAZOR HEAD

CROSS REFERENCE TO RELATED APPLICATIONS

This application is a National Stage Application of International Application No. PCT/EP2018/051758, filed on Jan. 24, 2018, now published as WO2018/141605 and which claims priority to European Application No. EP17154637.7, filed Feb. 3, 2017.

FIELD

The instant disclosure relates to blade supports, cutting members comprising such blade supports, razor heads comprising such a cutting member, and mechanical shaving razors comprising such razor heads.

BACKGROUND

Blade support for a shaving razor, having an inner face and an outer face comprising: an elongated lower portion, an elongated upper portion, and an elongated intermediate bent portion intermediate the lower and upper portions, said upper portion extending forward said intermediate bent portion to a top side, said lower portion extending downward from said intermediate bent portion to a bottom side; were disclosed, for example, in WO 2010/069388. Another example of the blade support can be found in the US patent application No. 2008/066315 that discloses a supported blade for use in a shaving system that comprises a blade support having surface coated with aluminum. Another example of the shaving razor can be found in the International patent application No. 2018/007131.

However, one still strives to improve the performance of such shavers.

SUMMARY

Accordingly, in embodiments, disclosed are blade supports having a maximum thickness of between about 0.12 and about 0.21 millimeters. Extremities of such blade support, i.e. a top side and/or a bottom side are substantially curved surfaces.

With these features, the design of the new blade support increases the shaving performances and/or facilitates the manufacturing process.

In some embodiments, one might also use one or more of the features as defined in the dependent claims.

Advantages of one or more of the embodiments listed below may include:

- the glideness, or fluidity, is improved, as it enables to provide a smaller gap from edge to edge and to avoid skin bulging effect which in turn can cause undesirable skin irritation,
- the shaving precision is improved as it enables to provide a smaller razor head that fits easier on the difficult areas to be shaved.

Advantageous embodiments of this concept may include one or more of the following additional features:

- aid blade support has a maximum thickness of between 0.155 and 0.185 millimeters;

- said blade support has a maximum thickness of about 0.17 millimeters;
- the inner face, at the intermediate bent portion, has a radius of curvature that is more than 0.1 millimeters;
- the inner face, at the intermediate bent portion, has a radius of curvature of between 0.11 and 0.40 millimeters;
- the inner face of the bent portion of the support has a groove;
- the angle between a plane parallel to said lower portion and said upper portion is between 60 and 76 degrees;
- said blade support is made of metal.

Further advantageous embodiments define a cutting member comprising at least one blade support as described above and a razor blade comprising a cutting edge and a lower face fixed on the outer face of the upper portion of the blade support.

The cutting member may advantageously include one or more of the following additional features:

- said razor blade is fixed on the upper portion of the blade support by at least one welding spot;
- the at least one welding spot is performed on the blade;
- the at least one welding spot is performed on the blade support;
- a portion of the blade which is in contact with the blade support has a maximum length of between 0.39 and 0.59 millimeters;
- the cutting edge of the blade is at least between 0.2 and 0.5 millimeters away from the top side of the blade support;
- the razor blade has a thickness of about 0.1 millimeters or less.

Further advantageous embodiments define a razor head comprising a frame, at least one cutting member as described above, wherein said at least one blade support is received by said frame.

The razor head may advantageously include one or more of the following additional features:

- the blade support is movably mounted in said frame along a first degree of freedom;
- the razor head comprising five blade supports and a blade fixed on each respective blade support.

Further advantageous embodiments define a mechanical shaving razor comprising a handle and a razor head as described above.

BRIEF DESCRIPTION OF THE DRAWINGS

Other characteristics and advantages will readily appear from the following description of one of its embodiments, provided as a non-limitative example, and of the accompanying drawings.

On the drawings.

On the different Figures, the same reference signs designate like or similar elements.

DETAILED DESCRIPTION

Figure 1:
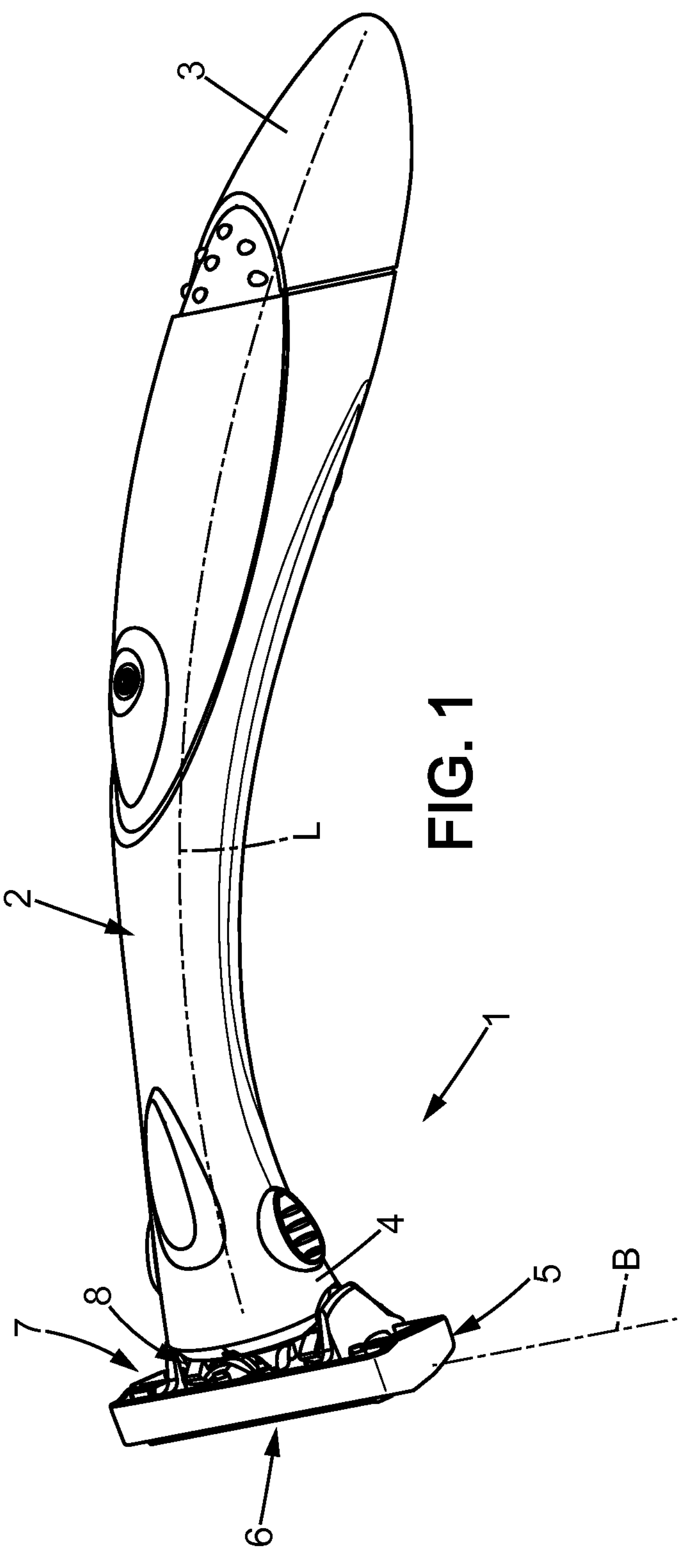
FIG. 1 is a perspective view of a shaving razor according to the present disclosure.

FIG. 1 shows a shaving razor 1, i.e. a shaver the blades of which are not driven by a motor relative to the blade unit.

The shaving razor 1 includes a handle 2 extending in a longitudinal direction L between a proximal portion 3 and a distal portion 4 bearing a razor head 5 or blade unit. The longitudinal direction L may be curved or include one or several straight portions.

The razor head 5 includes an upper face 6 equipped with one or several blades and a lower face 7 which is connected to the distal portion 4 of the handle 2 by a connection mechanism 8. The connection mechanism 8 may for instance enable the razor head 5 to pivot relative to a pivot axis B which is substantially perpendicular to the longitudinal direction L. Said connection mechanism 8 may further enable to selectively release the razor head 5 for the purpose of replacing razor heads 5. One particular example of connection mechanism suitable to be used in the present context is described, for example, in document WO-A-2006/027018.

Figure 2:
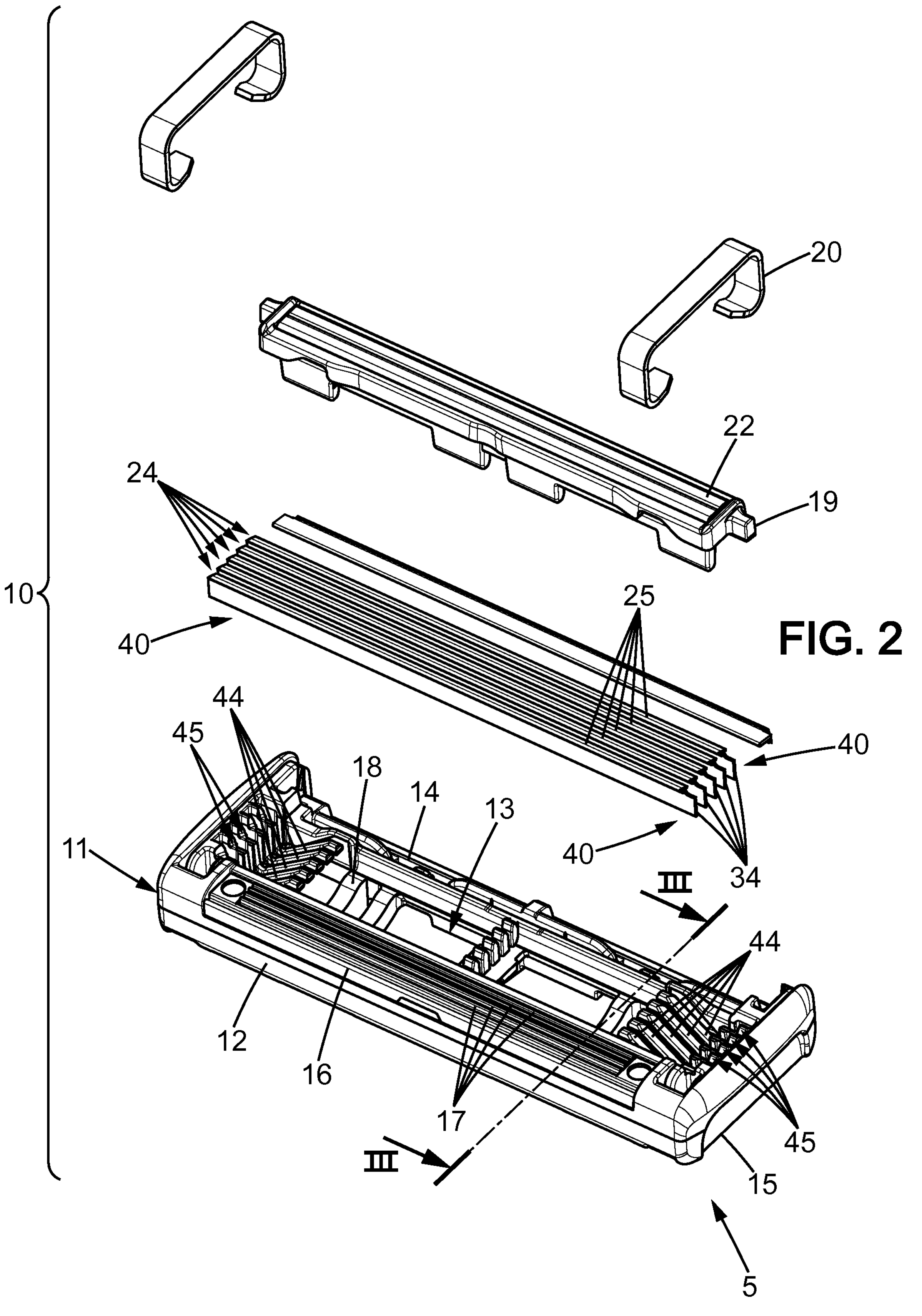
FIG. 2 is an exploded perspective view of the razor head of the shaving razor of FIG. 1.
Figure 3:
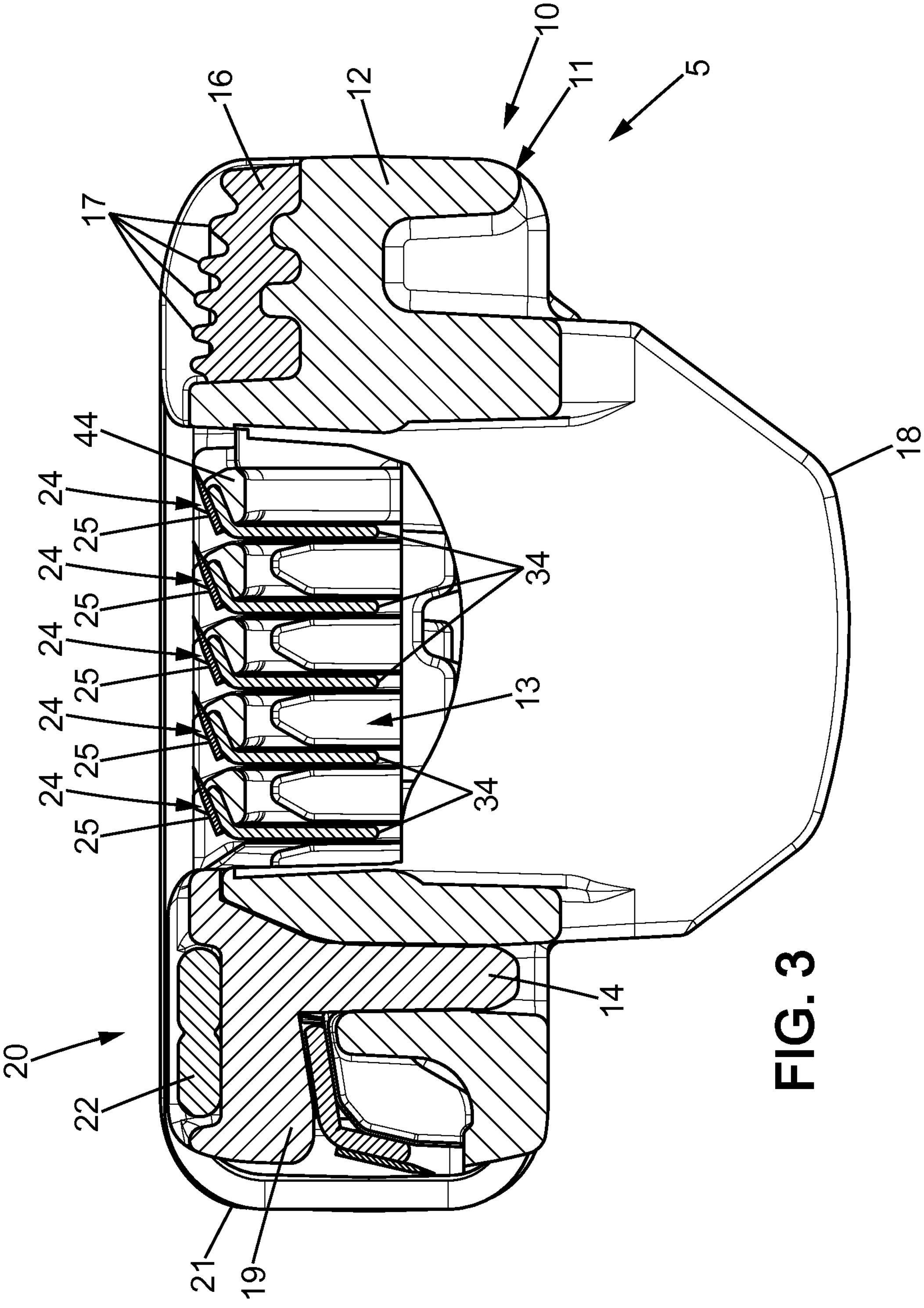
FIG. 3 is a cross section of the razor head of FIG. 2, along line III-III of FIG. 2.

As shown in FIGS. 2 and 3, the razor head 5 includes a frame 10 made solely of synthetic materials, i.e. plastic materials and elastomeric materials.

More precisely, the frame 10 includes a plastic platform member 11 connected to the handle 2 by the connection mechanism 8 and having:

- a guard 12 extending parallel to pivot axis B,
- a blade receiving section 13 situated rearward of the guard 12 in the direction of shaving,
- a cap portion 14 extending parallel to pivot axis B and situated rearward of the blade receiving section 13 in the direction of shaving,
- and two side portions 15 joining the longitudinal ends of the guard 12 and of the cap portion 14 together.

In the example shown in the figures, the guard 12 is covered by an elastomeric layer 16 forming a plurality of fins 17 extending parallel to pivot axis B.

Further, in this example, the underside of the platform member 11 includes two shell bearings 18 which belong to the connection mechanism 8 and which may be for example as described in the above-mentioned document WO-A-2006/027018 (see FIGS. 2 and 3).

The frame 10 further includes a plastic cover 19 which exhibits a general I shape which partially covers the cap portion 14 of the platform. The frame 10 further includes two retainers 20 which cover the two side members 15 of the platform. Each retainer 20 could comprise metal, plastic or other suitable material.

The plastic cover 19 forms, with the cap portion 14 of the platform, a cap 21 which comes into contact with the skin of the user during shaving. The plastic cover 19 may include a lubricating strip 22 which is oriented upward and contacts the skin of the user during shaving. This lubricating strip 22 may be formed for instance by co-injection with the rest of the cover.

Besides, the side members 21 of the cover form, together with the side members 15 of the platform, two side portions of the frame 10, joining the guard 12 to the cap 22.

The cover 19 may be fixed to the platform 11 by any known means, for instance by ultrasound welding or by laser welding, for instance as described in document WO-A-2005/108024.

Besides, at least one cutting member 24 is movably mounted in the blade receiving section 13 of the platform. The blade receiving section 13 may include several cutting members 24, for instance five cutting members 24 as in the example shown in the drawings.

As shown in FIGS. 3 and 5*a*-8, each cutting member 24 includes a bent blade support 34 and a blade 25. The blade 25 is formed by a flat steel strip with a cutting edge 26 oriented forward in the direction of shaving. Each blade 25 has an upper face 27 oriented towards the skin to be shaved and a lower face 28 oriented toward the handle 2. The upper and lower faces 27, 28 of the blade 25 include, respectively, two parallel main surfaces 29, 30 and two tapered facets 31, 32 which taper towards the cutting edge 26.

Figure 5A:
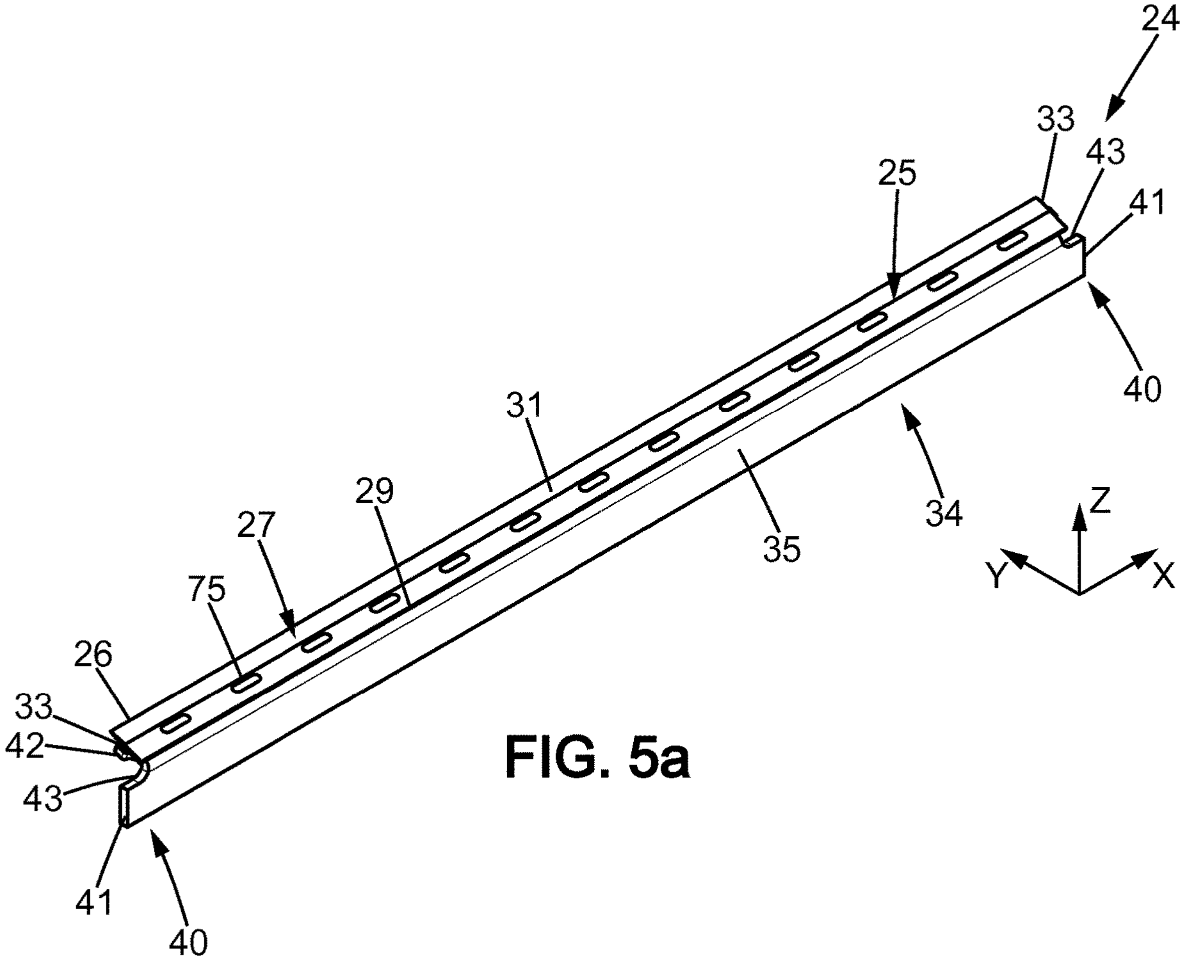
FIGS. 5*a*, 5*b* and 5*c* are respectively a perspective view, a rear view and a top view of one of the cutting members of the razor head of FIGS. 2 and 3.
Figure 5B:
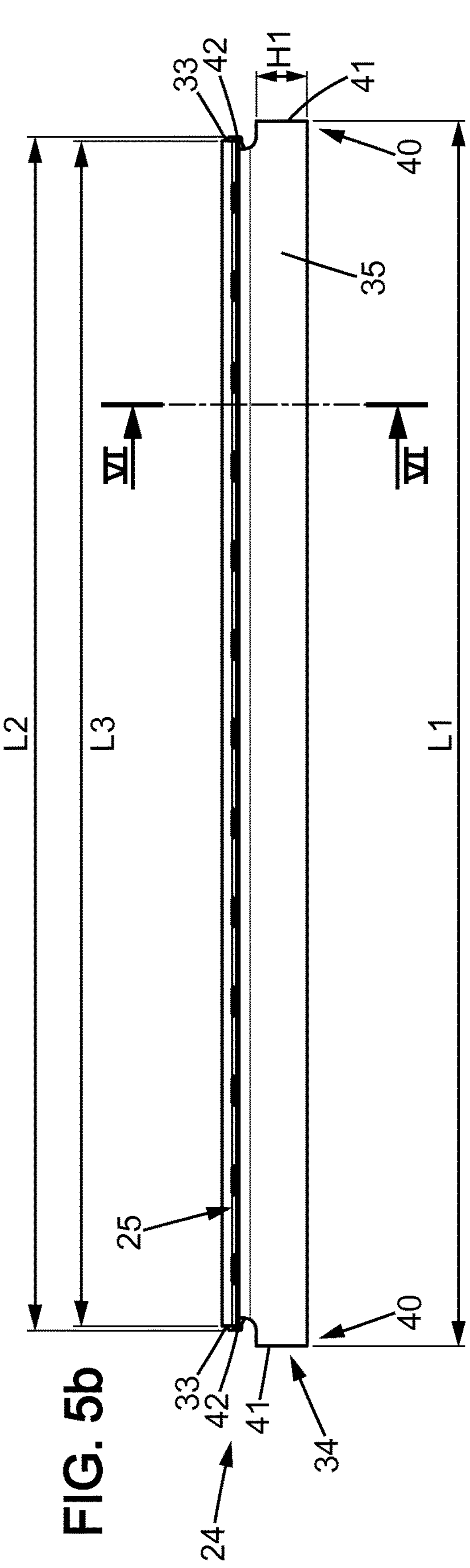
Figure 5C:
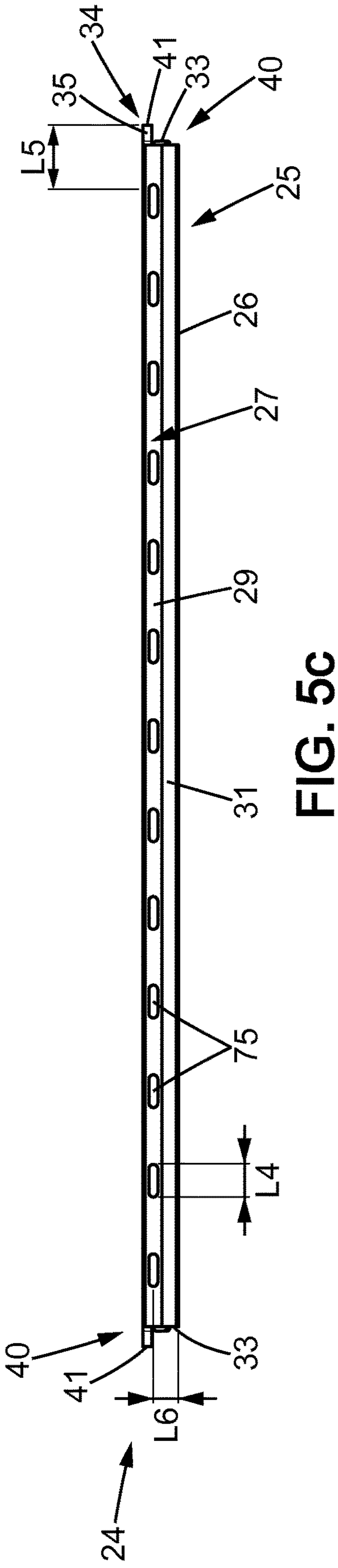
Figure 6:
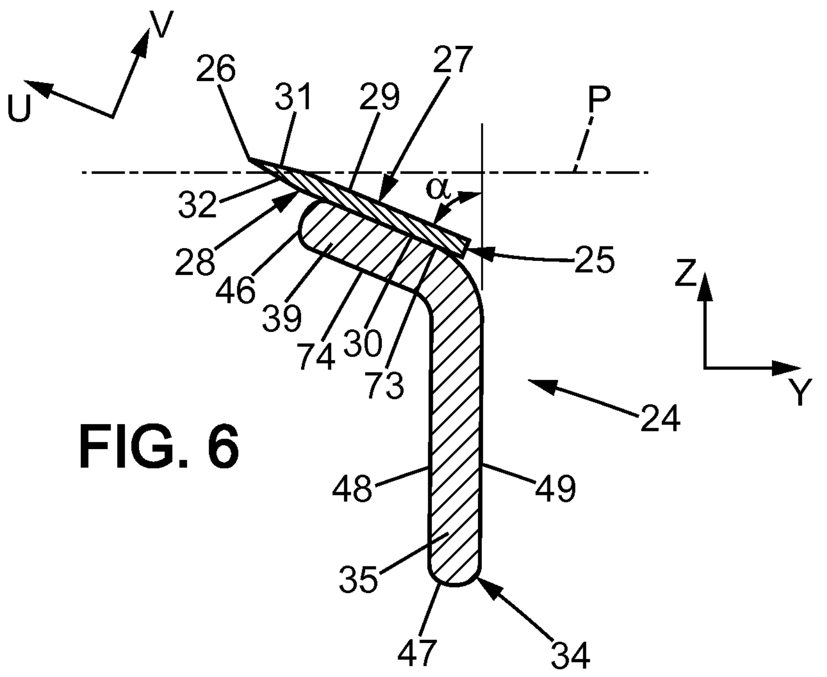
FIG. 6 is a cross section of the cutting members of FIG. 2, along line VI-VI of FIG. 5*b*.

As shown in FIGS. 5*a,* 5*b,* 5*c* and 7, each blade 25 extends longitudinally, parallel to pivot axis B, between two lateral ends 33.

Figure 4:
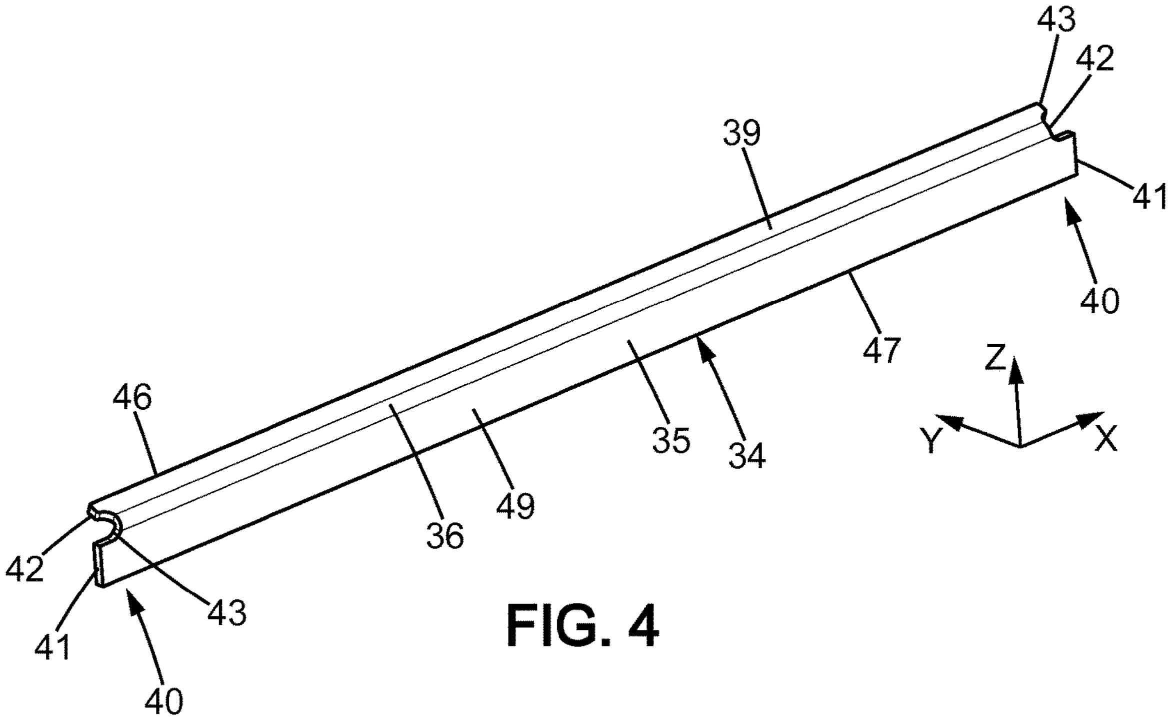
FIG. 4 is a perspective view of a blade support.
Figure 7:
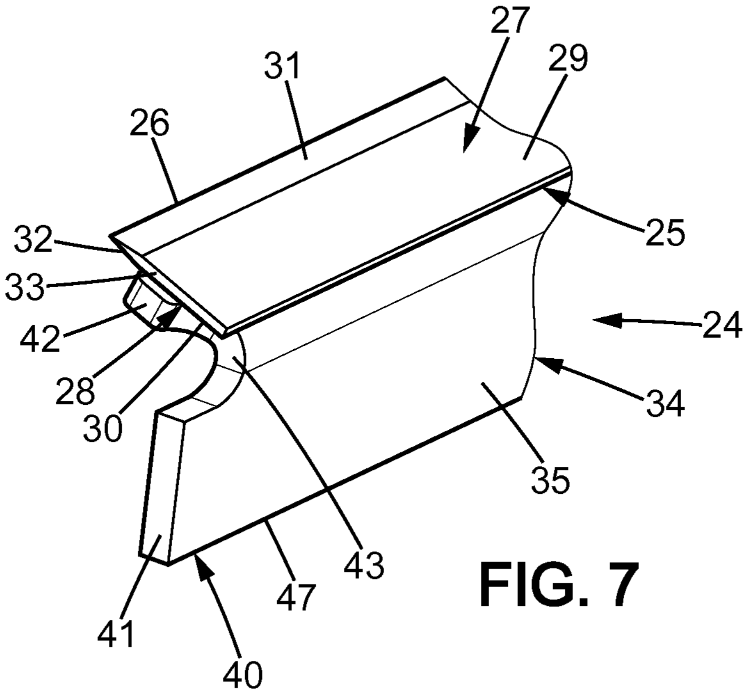
FIG. 7 is a perspective view of one end of the cutting member of FIGS. 5*a*-6.
Figure 8:
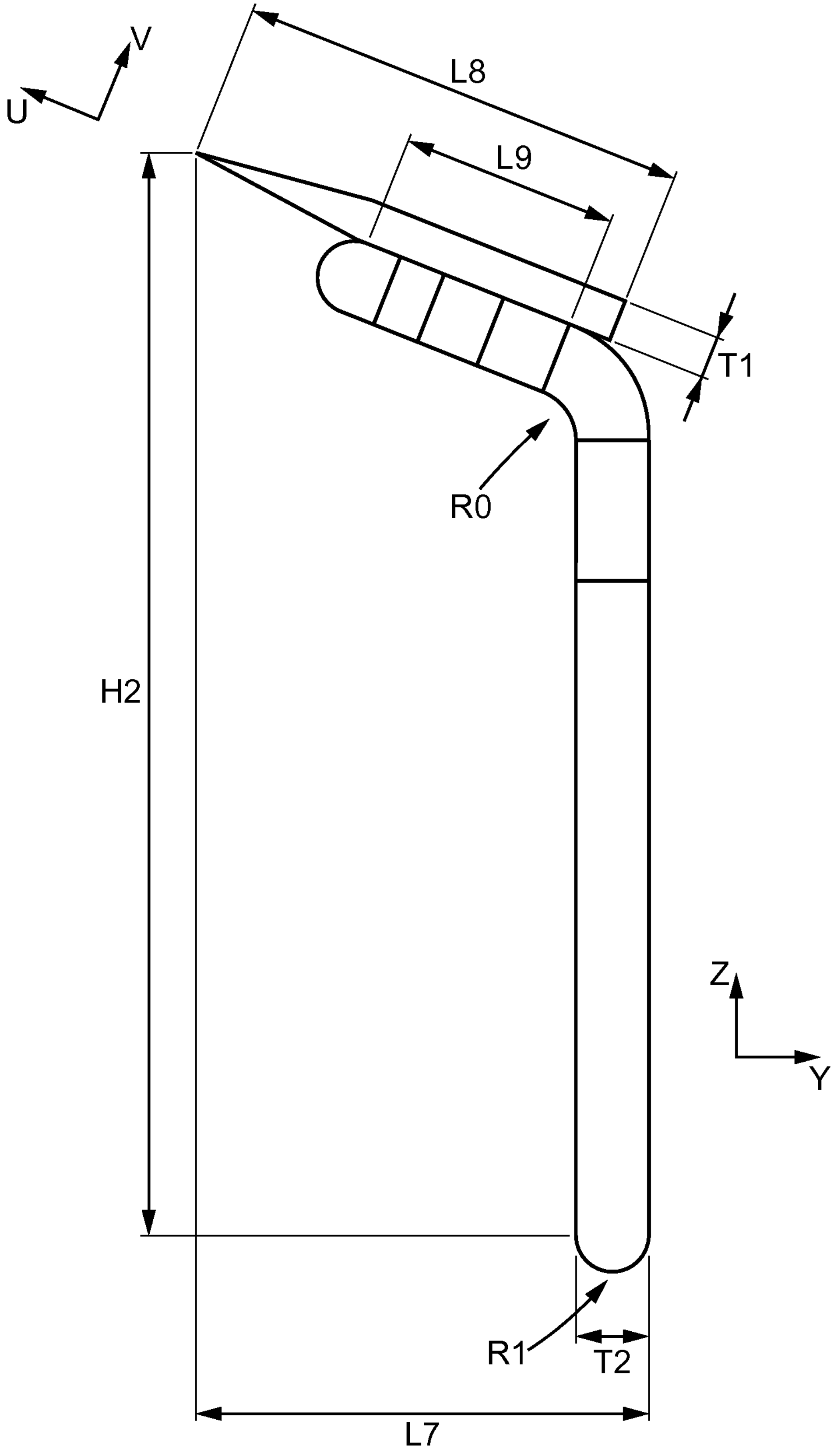
FIG. 8 is an enlarged sectional view of the cutting members of FIG. 2, along line VI-VI of FIG. 5*b.

Each blade 25 is borne by a blade support 34 which is visible in more details in FIGS. 4 and 7. For example, the blade support 34 is a sheet metal part made out of steel with a bent profile. Alternately, the blade support 34 could comprise plastic, or another suitable material part, with a bent profile.

Besides, as shown in FIG. 2, the lateral portions 40 of the blade supports 34 are slidingly mounted in vertical slots 45 (i.e. slots which are substantially perpendicular to the shaving plane P) provided in the inner face of each side member 15 of the platform.

The cutting members 24 are elastically biased by the elastic fingers 44 toward a rest position. In this rest position, the upper faces 27 of the blades 25, at each lateral end of the blades 25, bear against corresponding upper stop portions which are provided on the bottom face of each retainers 20 of the frame 10, said retainers 20 covering the slots 45 (not visible).

Therefore, the rest position of the cutting members 24 is well defined, therefore enabling a high shaving precision.

As seen above, the blade support 34 is an elongated bent thin piece of rigid material, such as metal, in particular austenitic stainless steel. For example, it was obtained by cold rolling, annealing, and split to appropriate width from a base material. This base material has, for example, the following composition (in mass percentage):

C=[0.01; 0.3], and preferably [0.04; 0.12],
Cr=[10; 20], and preferably [16; 20],
Mn=[0; 8], and preferably [6; 7],
Ni =[0; 15], and preferably [4; 7],
N=[0; 0.50], and preferably [0; 0.25],
Si=[0; 2], and preferably [0.2; 0.5],
P=[0; 0.05], and preferably [0; 0.02],
S=[0; 0.05], and preferably [0; 0.01],
Mo=[0;4], and preferably [0; 1.0]

Such material has a hardness of about 150-300 Hv1Kgf, and preferably a hardness of about 200-250 Hv1Kgf. Such material has a tensile strength of about 400-1000 $N/mm^2$, and preferably a tensile strength of about 800-950 $N/mm^2$. Such material has a proof strength Rp 0.2% of 200-600 MPa, and preferably a proof strength Rp 0.2% of 350-500 MPa. Such material has an elongation at fracture of 20-80%, and preferably an elongation at fracture of 45-60%.

The blade support 34 includes:

- a substantially elongated flat lower portion 35, a substantially elongated flat upper portion 39 which extends parallel to the blade 25, and an elongated bent portion 36 between the upper portion 39 and lower portion 35.

The upper portion 39 extends forward from said bent portion 36 to a top side 46, and the lower portion 35 extends downwards from said bent portion 36 to a bottom side 47. The top side 46 and/or the bottom side 47 are substantially curved surfaces. The curved surfaces may have a radius of curvature R1 between 0.065 mm and 10 mm (e.g. 0.08 mm and 0.25 mm. A blade support 34 has two opposite faces 48, 49. The lower portion 35 is substantially flat, and the upper portion 39 thereof also is substantially flat and angled with respect to the lower portion by an angle of about 104-120 degrees (about 112°). The angle of the upper portion 39 and of the blade 25 with respect to the shaving plane P may be about 22°. The angle a on FIG. 6 between a plane parallel to the lower portion 35 and the upper portion 39 is between 60 and 76 degrees (°) (about 68°).

Furthermore, the inner face 48, at the intermediate bent portion 36, has an inner radius of curvature RO that is more than 0.1 mm. The inner radius of curvature RO is less than 0.9 mm. It has been determined that the minimum recommended inner radius of curvature RO of a sheet metal should be at least the same to its thickness T2. In the case of the disclosed blade support 34, a safety factor of 1, 5 has been applied on the value of the thickness T2 of the blade support 34. By multiplying the safety factor with the preferable thickness T2, which is about 0.17 mm, we get a radius of curvature RO about 0.25 mm. Preferably, the radius of curvature RO is between 0.11 mm and 0.40 mm (e.g. between 0.20 mm and 0.30 mm), most preferably about 0.25 or 0.28 mm.

In the following, the frame of reference X-Y-Z is used to describe the geometry of the lower portion 35. X designates the length (the elongation direction) of the lower portion 35, Y refers to the direction along which the lower portion 35 is smallest (thickness direction) and Z corresponds to the third direction of the lower portion 35, which is referred to as the height. The frame of reference X-Y-Z is a local frame of reference attached to the lower portion 35.

Another frame of reference is used to describe the geometry of the upper portion 39. The longitudinal direction X remains the same as above. The direction U, or depth direction, defines with direction X the plane of an upper surface 73 of the upper portion 39 of the blade support 34. The direction V is the normal direction to the plane X-U.

When it comes to the geometric features of the blade support 34, its thickness T2 (see FIG. 8) is about 0.17 mm (for example comprised between 0.12 and 0.21 mm, preferably between 0.155 and 0.185).

As shown in FIGS. 4-7, the lower portion 35 of the blade support 34 extends longitudinally, along the longitudinal direction X, between two lateral portions 40. Each lateral portion 40 includes a side edge 41.

Besides, the upper portion 39 of the blade support 34 extends longitudinally, along the longitudinal direction X, between two lateral edges each including a protrusion 42. The length L2 between each rounded protrusion 42 is slightly smaller than a length L1 between each side edge 41. The rounded protrusion 42 is constituted by a lateral wing with rounded angles protruding laterally from the upper portion 39 and from a corresponding lateral end 33 of the blade 25. The length L3 between each lateral end 33 of the blade 25 is slightly smaller than the length L2.

Further, a rounded indent 43 is cut out from the sheet metal forming the blade support, said rounded indent 43 separating the rounded protrusion 42 from the lateral edge 41 of the lower portion 35. The height H1 of the lower portion 35, between the bottom side 47 and the rounded indent 43 is about 1.6 mm (for example between 1.5 and 1.7 mm).

The side edges 41 of the lower portion 35 of the blade support 34 protrude laterally from the lateral ends 33 of the blade 25 and from the rounded protrusions 42.

The blade support 34 may be made from a flat sheet metal part which is then bent before welding of the blade 25 on the upper portion 39 thereof.

As shown in FIGS. 2 and 3, each cutting member 24 is borne by two elastic fingers 44 which are molded as a single piece with platform 11 and which extend towards each other and upwardly from both side members 15 of the platform.

The cutting member 24 further comprises a razor blade 25. The blade 25 has, in its flat portion, a thickness T1 about 0.1 mm (for example between 0.04 and 0.11 mm). The length L8 of the blade 25, which is the long of said blade 25 along axis U from its cutting edge 26 to its opposite back edge, is about 1.0 mm (for example between 0.8 and 1.3 mm). The part, along the axis U, of the blade 25, which is in contact with the upper portion 39 of the blade support 34 has a length L9 which is about 0.49 mm +/−0.1 mm long. In this way, a good retention of the blade on the support is ensured. The cutting edge 26 is between 0.2 mm and 0.5 mm, preferably about 0.36 mm, away from the top side 46 of the blade support 34, so that the blade support 34 does not hinder the shaving performance of the neighboring razor blades.

The length L7 of the cutting member 24, between the cutting edge 26 and the outer face 49 of the lower portion 35 of the blade support 34, is about 1.0 mm (for example between 0.9 and 1.6 mm).

The blade 25 is fixed on the upper portion 39 of the blade support 34 by any known means, for instance by laser spot welding. The lower face 28 and the upper face 27 of the blade 25 are substantially flat behind the cutting edge 26, and taper (comprising the two tapered facets 31, 32) converging to the cutting edge 26. The lower face 28 of the blade 25 is in contact with the upper surface 73 of the upper portion 39 of the blade support 34 and is fixed thereto by at least one spot weld 75.

Preferably, the lower face 28 of the blade 25 is fixed on the upper portion 39 by a plurality of spot welds 75 (for example between ten and sixteen spot welds 75, preferably thirteen spots weld 75). Each spot weld may have an elongated circle shape or an oval shape. Each spot weld 75 width is about 0.3 mm (for example between 0.2 and 0.4 mm) and length L4 is about 1.0 mm (for example between 0.9 and 1.1 mm). A minimum distance L5 is provided between the first spot weld 75 and one of the side edge 41 of the lower portion 35 of the blade support 34. For example, the distance L5 is about 2.0 mm. A minimum distance L6 is provided between the spot weld 75 center and the cutting edge 26 of the blade 25. For example, the distance L6 is about 0.7 mm. The tapered facets 31, 32 extend beyond the cutting edge 26, along the axis U.

Each of the spot welds 75 is carried out on the upper face 27 of the blade 25. More precisely, each of the spot welds 75 is carried out on the main surfaces 29 of the upper face 27 of the blade 25.

Alternatively, each of the spot welds 75 is carried out on the inner face 48 of the upper portion 39 of the blade support 34. More precisely, each of the spot welds 75 is carried out on a lower surface 74, opposite to the upper surface 73, of the inner face 48 of the upper portion 39 of the blade support 34.

When it comes to the geometric features of the cutting member 24, its height H2 is about 2.58 mm (for example comprised between 2.53 and 2.63 mm).

The above description provides with a first embodiment of a blade support 34. According to a second embodiment, as shown on FIG. 9, the blade support 34 differs from the previously described support in that it might comprise a recess 79 on the outer face 49 in the intermediate bent portion 36. This recess 79 extends along the longitudinal direction X. This recess 79 could have a concave shape, as shown on FIG. 9, or could have a triangular cross-section or a convex shape. Other geometries are possible. This recess 79 could extend between the two lateral edges of the bend portion 36.

Figure 9:
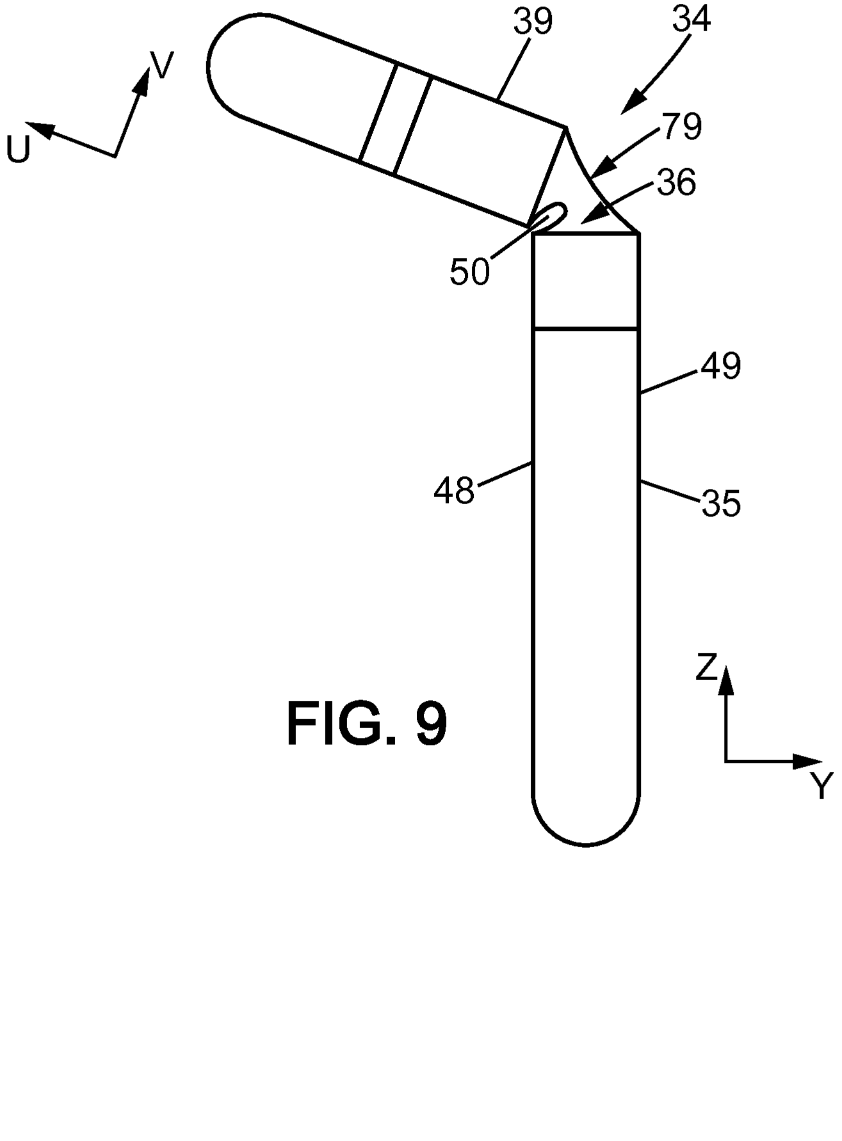
* and FIG. 9 is a sectional view of a blade support according to a second embodiment.

Optionally, according to the second embodiment, as shown on FIG. 9, the blade support 34 differs from the previously described support in that it might comprise a longitudinal groove 50 at least on the intermediate bent portion 36. More preciously, the longitudinal groove 50 is comprised on the inner face 48 in the intermediate bent portion 36. The groove 50 extends along the longitudinal direction X. This groove 50 could have a triangular cross-section or a convex shape. Other geometries are possible. This groove 50 extends between the two lateral edges of the bend portion 36.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A blade support for a shaving razor, the blade support comprising:
- an inner face, an outer face, a lower portion, an upper portion, and an intermediate bent portion extending as an interface between the lower and upper portions, wherein the inner face and the outer face, at the intermediate bent portion, each form continuous surfaces along the interface;
- the upper portion extending forward of the intermediate bent portion towards a top side;
- the lower portion extending downward from the intermediate bent portion towards a bottom side;
- the blade support having a thickness greater than 0.12 and less than 0.21 millimeters (mm);
- the inner face, at the intermediate bent portion, having a radius of curvature from 0.20 to 0.28 millimeters (mm); and
- the top side and the bottom side are substantially curved surfaces having a radius of curvature that is greater than 0.065 and less than 0.13 millimeters (mm).

2. The blade support according to claim 1, wherein the thickness is between 0.155 and 0.185 millimeters (mm).

3. The blade support according to claim 1, wherein the thickness is 0.17 millimeters (mm).

4. The blade support according to claim 1, wherein an angle formed between a plane parallel to the lower portion and a plane parallel to the upper portion is between 60 and 76 degrees) (°).

5. A cutting member comprising:
- at least one blade support according to claim 1; and
- a razor blade,
- the razor blade including a cutting edge and a lower face, the lower face of the razor blade being fixed on the outer face of the upper portion of the blade support.

6. The cutting member according to claim 5, wherein the razor blade is fixed on the upper portion of the blade support by at least one welding spot.

7. The cutting member according to claim 5, wherein a portion of the lower face of the razor blade which is in contact with the blade support has a length of between 0.39 and 0.59 millimeters (mm).

8. A razor head comprising:
- a frame; and
- at least one cutting member according to claim 5, wherein the at least one blade support is received by the frame.

9. The razor head according to claim 8, wherein the blade support is movably mounted in the frame.

10. A mechanical shaving razor comprising: a handle and a razor head according to claim 8.

11. A blade support for a shaving razor, the blade support comprising:
- an inner face, an outer face, a lower portion, an upper portion, and an intermediate bent portion extending as an interface between the lower and upper portions, wherein the inner face and outer face are continuous surfaces along the interface;
- the upper portion extending forward of the intermediate bent portion towards a top side and the lower portion extending downward from the intermediate bent portion towards a bottom side such that the upper portion and the lower portion are disposed at an angle with respect to one another;
- the inner face, at the intermediate bent portion, has a radius of curvature from 0.20 to 0.28 millimeters (mm)
- the blade support having a thickness greater than 0.12 and less than 0.185 millimeters (mm); and
- the top side and the bottom side are substantially curved surfaces having a radius of curvature from 0.065 to 0.13 millimeters (mm).

12. The blade support of claim 1, wherein the inner face, at the intermediate bent portion, has a radius of curvature of 0.28 millimeters (mm).

13. A blade support for a shaving razor, the blade support comprising:
- an inner face, an outer face, a lower portion, an upper portion, and an intermediate bent portion extending as an interface between the lower and upper portions, wherein the inner face and outer face are continuous surfaces along the interface;
- the upper portion extending forward of the intermediate bent portion towards a top side and the lower portion extending downward from the intermediate bent portion towards a bottom side such that the upper portion and the lower portion are disposed at an angle with respect to one another;
- the inner face, at the intermediate bent portion, has a radius of curvature of 0.28 millimeters (mm).
- the blade support having a thickness greater than 0.12 and less than 0.185 millimeters (mm); and
- the top side and the bottom side are substantially curved surfaces having a radius of curvature from 0.065 to 0.13 millimeters (mm).

14. The blade support of claim 1 further comprising a rounded indent at at least one lateral edge of the lower portion of the blade support.

15. The blade support of claim 14, wherein the rounded indent separates the lower portion from a rounded protrusion in the upper portion of the blade support.

16. The blade support of claim 15, wherein:

the blade support is one of multiple blade supports in a razor head comprising five blade supports;

an angle between a plane parallel to the lower portion and the upper portion is between 60 and 76 degrees;

a thickness of the blade support is between 0.12 and 0.21 mm;

the blade support comprises a rounded indent at each of both lateral edges of the lower portion of the blade support; and a height of the lower portion, between a bottom side and the rounded indent is between 1.5 mm and 1.7 mm.

17. The blade support of claim 11 further comprising a rounded indent at at least one lateral edge of the lower portion of the blade support.

18. The razor head of claim 8, wherein the razor head comprises at least five blade supports.

19. The cutting member according to claim 5, wherein the razor blade includes a back edge opposite to the cutting edge, a tapered portion, and a flat portion, wherein the tapered portion is between the cutting edge and the flat portion, and the flat portion is between the tapered portion and the back edge, and wherein the flat portion has a thickness from 0.05 to 0.11 millimeters (mm).

20. The cutting member according to claim 19, wherein the back edge of the razor blade extends past the upper portion towards the intermediate bent portion and terminates before intersecting with a plane including the outer face of the lower portion.

* * * * *